(12) United States Patent
Demopoulos

(10) Patent No.: US 11,867,152 B2
(45) Date of Patent: Jan. 9, 2024

(54) WIND TURBINE WITH VERTICAL AXIS OF ROTATION OF THE ROTOR AND FLOATING WIND FARM COMPRISING A PLURALITY OF SUCH WIND TURBINES

(71) Applicants: Charalampos Tassakos, Stuttgart (DE); Andreas Demopoulos, Bedfordshire (GB)

(72) Inventor: Andreas Demopoulos, Bedfordshire (GB)

(73) Assignee: Charalampos Tassakos, Stuttgart (DE)

( * ) Notice: Subject to any disclaimer, the term of this patent is extended or adjusted under 35 U.S.C. 154(b) by 587 days.

(21) Appl. No.: 17/251,311

(22) PCT Filed: May 31, 2019

(86) PCT No.: PCT/EP2019/064226
§ 371 (c)(1),
(2) Date: Jun. 18, 2021

(87) PCT Pub. No.: WO2019/238437
PCT Pub. Date: Dec. 19, 2019

(65) Prior Publication Data
US 2021/0381488 A1 Dec. 9, 2021

(30) Foreign Application Priority Data
Jun. 12, 2018 (DE) ...................... 10 2018 114 004.5

(51) Int. Cl.
*F03D 3/06* (2006.01)
*F03D 3/00* (2006.01)

(52) U.S. Cl.
CPC ............. *F03D 3/064* (2013.01); *F03D 3/005* (2013.01); *F05B 2240/212* (2013.01);
(Continued)

(58) Field of Classification Search
CPC .......... F03D 3/005; F03D 3/061; F03D 3/064; F05B 2240/212; F05B 2240/302; F05B 2250/21; F05B 2250/71
See application file for complete search history.

(56) References Cited

U.S. PATENT DOCUMENTS 5,203,672 A    4/1993   Wolf
5,531,567 A *   7/1996   Hulls ...................... F03D 3/064
                                                 416/DIG. 8

(Continued)

FOREIGN PATENT DOCUMENTS

DE         3825241 A1    10/1989
DE    102011117631 A1    5/2013

(Continued)

OTHER PUBLICATIONS

English Abstract of DE102011117631.
English Abstract of FR2298707.
English Abstract of DE 3825241.

*Primary Examiner* — Igor Kershteyn
(74) *Attorney, Agent, or Firm* — Ware, Fressola, Maguire & Barber LLP

(57) ABSTRACT

The invention relates to a wind turbine (100) having a rotor (102) rotatable about a vertical axis of rotation (104) having a rotating hub (3) and a plurality of rotor blades disposed along an outer periphery of the rotor (102), each of which have a lower segment (4) and an upper segment (5) attached to an upper distal end of the lower segment (4). The lower proximal ends of the lower segments (4) of the rotor blades are each attached to the rotating hub (3). To form a particularly stable and lightweight platform for the rotor (102) or rotor blades, it is proposed that the lower segments (4) of the rotor blades form an inverted pyramid in conjunction with the hub (3), guy wires (7) and bracing wires (8), wherein the guy wires (7) interconnect first attachment points (6) in the (Continued)

area of the distal ends of the lower segments (4) and the bracing wires (8) connect the first attachment points (6) to the hub (3).

20 Claims, 18 Drawing Sheets

(52) U.S. Cl.
CPC ..... *F05B 2240/302* (2013.01); *F05B 2250/21* (2013.01); *F05B 2250/71* (2013.01)

(56) References Cited

U.S. PATENT DOCUMENTS

| | | | | |
|---|---|---|---|---|
| 7,726,934 | B2 * | 6/2010 | Cowan | F03D 3/005 |
| | | | | 415/4.4 |
| 8,061,993 | B2 * | 11/2011 | Sassow | F03D 3/061 |
| | | | | 416/227 R |
| 9,169,828 | B2 * | 10/2015 | Mangano | F03D 3/064 |
| 9,267,490 | B1 | 2/2016 | Paquette et al. | |
| 10,094,361 | B2 * | 10/2018 | Bardia | H02P 9/06 |
| 11,486,353 | B2 * | 11/2022 | Suzuki | F03D 3/062 |
| 2008/0267777 | A1 * | 10/2008 | Lux | F03D 3/062 |
| | | | | 416/132 B |
| 2010/0172759 | A1 | 7/2010 | Sullivan | |
| 2011/0176919 | A1 * | 7/2011 | Coffey | F03D 3/005 |
| | | | | 416/124 |
| 2011/0236181 | A1 | 9/2011 | Wygananski | |
| 2012/0224968 | A1 * | 9/2012 | Lux | F03D 3/005 |
| | | | | 416/196 A |
| 2015/0069759 | A1 * | 3/2015 | Aranovich | F03D 3/005 |
| | | | | 415/60 |
| 2021/0381488 | A1 * | 12/2021 | Demopoulos | F03D 3/005 |

FOREIGN PATENT DOCUMENTS

| | | |
|---|---|---|
| FR | 2298707 A1 | 8/1976 |
| WO | 97/20142 A1 | 6/1997 |
| WO | 2011/050452 A1 | 5/2011 |

* cited by examiner

WIND TURBINE WITH VERTICAL AXIS OF ROTATION OF THE ROTOR AND FLOATING WIND FARM COMPRISING A PLURALITY OF SUCH WIND TURBINES

CROSS-REFERENCE TO RELATED APPLICATIONS

This application is the U.S. National Stage of International Application Number PCT/EP2019/064226 filed on May 31, 2019, published on Dec. 19, 2019 under International Publication Number WO 2019/238437, which application claims benefit to an earlier filed German priority application no. 10 2018 114 004.5, filed Jun. 12, 2018. Both applications are hereby incorporated by reference in their entirety.

BACKGROUND OF THE INVENTION

1. Field of Invention

This invention relates to a wind turbine having a rotor rotatable about a vertical axis of rotation, the rotor having a rotating hub and a plurality of rotor blades disposed along an outer periphery of the rotor, each rotor blade having a lower segment and an upper segment attached to an upper distal end of the lower segment. The lower proximal ends of the lower segments of the rotor blades are each attached to the rotating hub. Further, the invention relates to a floating wind farm comprising a floating platform having a plurality of wind turbines mounted thereon.

2. Description of Related Art

An essential component of any wind turbine known from the prior art and having a vertical axis of rotation of the rotor (so-called vertical wind turbine) is a long central supporting or bearing element, to which the rotor blades are laterally arranged and secured or mounted.

FIGS. 1 and 2 show various forms of vertical wind turbines known in the prior art. The inertia and aerodynamic forces acting on the rotor blades result in a considerable bending moment being applied to the central support or bearing element. In the system shown in FIG. 1, several guy wires are used at the upper end to secure the central support or bearing element. To prevent them from obstructing the rotating rotor blades, these wires are anchored in the ground at a relatively large distance from the wind turbine. This method of securing the support or bearing element renders the wind turbines unsuitable for installation on a platform floating on the water, as it requires a large footprint because the guy wires extend at relatively flat angles, which would require a relatively large and therefore expensive floating platform.

In an alternative system, as shown in FIG. 2, the central support or bearing element is not secured by guy wires, but the support or bearing element is designed to be very strong to withstand the large bending moments cause by the rotor blades and the aerodynamic forces acting thereon. This is a very expensive solution, which significantly increases the overall cost of the wind turbine. In addition, such a turbine is relatively heavy, making it less suitable for use in floating wind turbines.

Based on the described prior art, this invention addresses the problem of designing and further developing a known vertical wind turbine in such a way that it is particularly suitable for use as a floating wind turbine.

SUMMARY OF THE INVENTION

To solve this problem, a vertical wind turbine having the new and unique features is proposed. In particular, starting from the wind turbine of the type mentioned above, it is proposed to have the lower segments of the rotor blades form an inverted pyramid in conjunction with the hub, guy wires and bracing wires, wherein the guy wires interconnect first attachment points in the area of the distal ends of the lower segments and the bracing wires connect the first attachment points to the hub.

This invention overcomes the disadvantages of the prior art by making two improvements. First, the central support or bearing element is eliminated. This is shown in FIGS. 5, 11 and 15, for instance. In this case, the rotor blades are secured as explained below: a lower segment of the rotor blades in conjunction with guy wires and a rotating hub on a base of the wind turbine is used to create a stable platform called an inverted pyramid. The pyramid has a base having at least three vertices. Preferably, the base of the inverted pyramid is a triangle (more preferably an isosceles or equiangular triangle). However, the shape of the base can also be a rectangle (in a special case a square) or any other equilateral polygon. The inverted pyramid is used to support the upper segment of the rotor blades using internal bracing wires attached to the vertices of the base of the inverted pyramid.

On the other hand, it is conceivable to retain the central supporting or bearing element, but at the same time to rig internal guy wires to the vertices of the base of the inverted pyramid to brace the supporting or bearing element. This is shown in FIG. 17 by way of example. The tension in the guy wires resolve the bending moment in the central support or bearing element into a mainly compressive force. Then, the central support or bearing element can be designed as a smaller and less expensive structure, as it no longer operates as a cantilever beam as shown in FIG. 2. Further, the internally braced support or bearing element does not interfere with the rotating rotor blades, and therefore a mounting or bearing of the central support or bearing element does not require a footprint larger than that of the wind turbine itself.

BRIEF DESCRIPTION OF THE DRAWING

Preferred developments of this invention are the subject of the dependent claims. Their essential features and advantages are explained in more detail below with reference to the figures. In this regard, the figures show various exemplary embodiments of this invention. It goes without saying, however, that the individual features of the various exemplary embodiments may be combined with one another in any desired manner without this having to be expressly shown in the figures or described below. The figures show:

DETAILED DESCRIPTION OF THE PRESENT INVENTION

Figure 1:
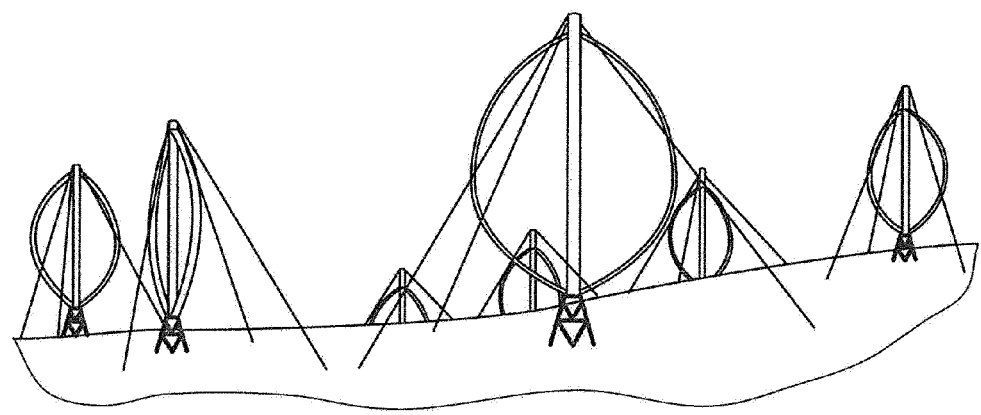
FIG. 1 shows a first example of a vertical wind turbine known from the prior art.
Figure 2:
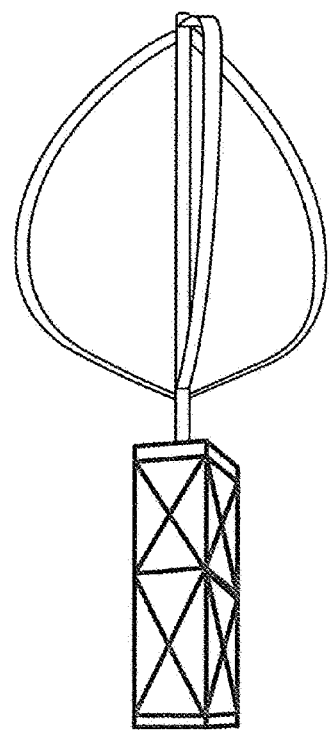
FIG. 2 shows a second example of a vertical wind turbine known from the prior art.
Figure 3:
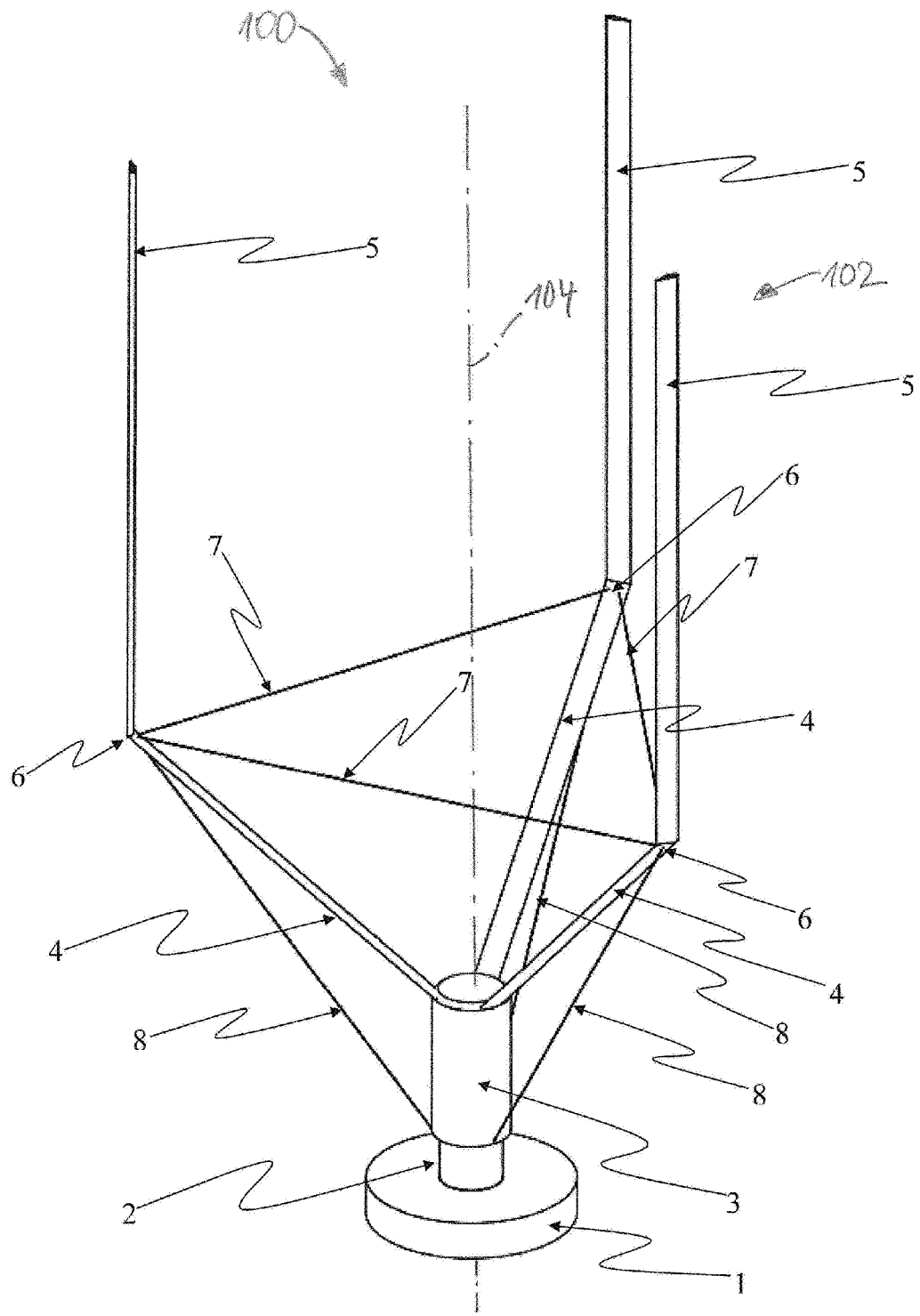
FIG. 3 shows a first exemplary embodiment of a wind turbine according to the invention having bracing wires, but without guy wires.
Figure 4:
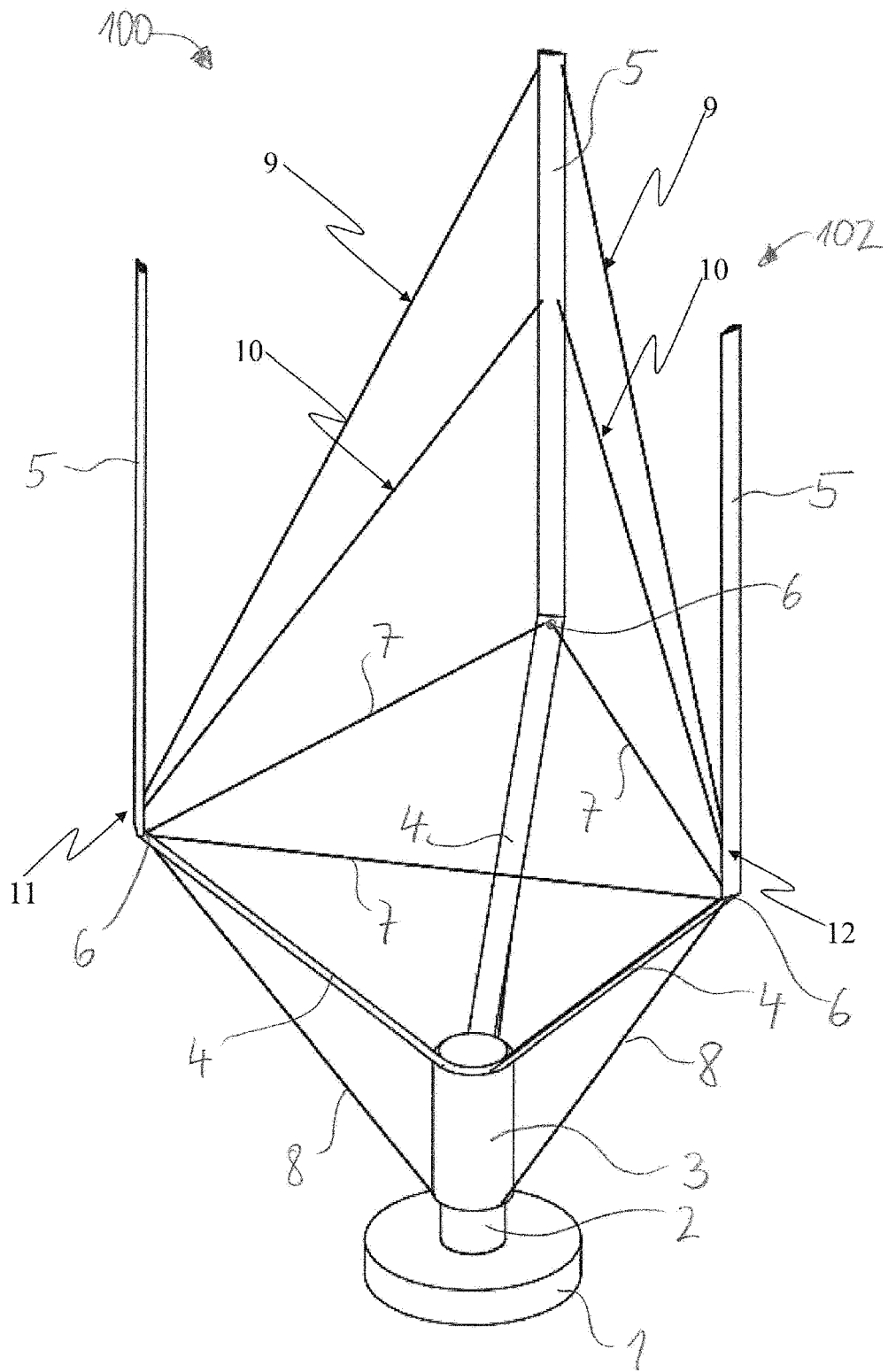
FIG. 4 shows the wind turbine according to the invention having bracing wires and guy wires for one of the rotor blades.
Figure 5:
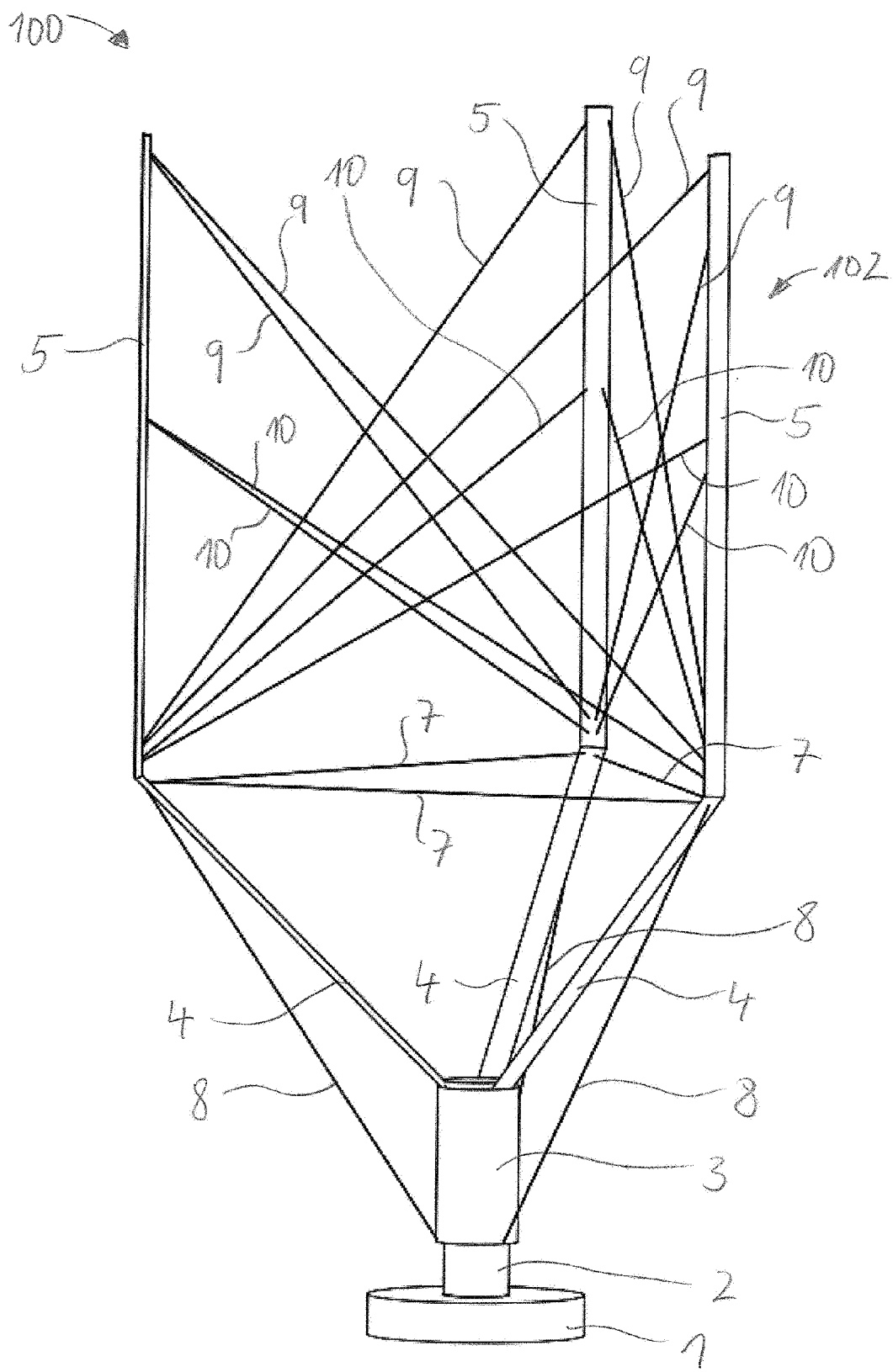
FIG. 5 shows the wind turbine according to the invention in FIG. 3 having bracing wires and guy wires for all rotor blades.

FIGS. 3-5 illustrate a wind turbine, the entirety of which is designated by the reference numeral 100. The wind turbine 100 has a rotor 102 having a vertical axis of rotation 104. Therefore, the wind turbine 100 is also referred to as a vertical wind turbine. The rotor 102 of the wind turbine 100 according to the exemplary embodiment of FIGS. 3-5 has three rotor blades 4, 5 arranged at equal angles (120°) about the vertical axis of rotation 104.

FIG. 3 shows that the rotor blades 4, 5 are bi-partite. The lower proximal end of a lower segment 4 having a substantially straight length is attached to the upper surface of a rotating hub 3, and extends obliquely outwards and upwards from the hub 3 at an angle of approximately 30-60° relative to a vertical. An upper segment 5 of the rotor blades has a mainly straight length and is attached to an upper distal end of the lower segment 4 and is at an angle of approximately 30-60° relative to the length of the lower segment 4. The length of the upper segment 5 of the rotor blades extends mainly in parallel to the axis of rotation 104.

The structure of the rotor 102 of the wind turbine 100 according to the invention is explained in more detail with reference to FIG. 3. The lower segment 4 of the rotor blades in conjunction with guy wires 7 and the rotating hub 3 at a base 1 of the wind turbine 100 are used to create a stable platform, referred to as an inverted pyramid. The base 1 of the wind turbine 100 is secured to the ground or elsewhere, for instance on a floating platform. A round mount (bearing element) 2 is attached to the base 1. The hub 3, having a mount which is circular in cross-section, is rotatably mounted on the stationary mount 2 such that the hub 3 can rotate about the vertical axis of rotation 104 relative to the mount 2.

The reference numeral 6 denotes defined attachment points at the upper distal end of the lower segments 4, which are in proximity to the connection to the upper segments 5 of the rotor blades. The actual fasteners attached to the attachment points 6 are not shown, as such fasteners are well known from the prior art. The guy wires 7 interconnect the attachment points 6, while the bracing wires 8 connect the attachment points 6 to a lower segment of the rotating hub 3 near the base 1.

Imagined downward extensions of the stiffener wires 8 intersect at the vertical axis of rotation 104, forming the apex of the inverted pyramid.

By pretensioning the guy wire 7 and the bracing wires 8, they exert compressive forces on the lower segments 4 of the rotor blades starting from the attachment points 6 down to the hub 3. This arrangement forms a stable platform on the base 1 of the wind turbine 100 in the shape of the inverted pyramid, wherein the attachment points 6 form the three vertices of the base of the inverted pyramid. This stable platform is hereinafter referred to as the inverted pyramid and comprises essentially the four elements listed below:

the rotating hub 3,
the lower segment 4 of the rotor blades in conjunction with the matching attachment points 6, p1 guy wires 7 interconnecting the attachment points 6 and
bracing wires 8 connecting the attachment points 6 to the hub 3.

FIG. 3 shows an embodiment of a wind turbine 100 having three rotor blades. Three rotor blades are the minimum number of rotor blades required to design the stable platform in the shape of the inverse pyramid. If a wind turbine 100 has more than three rotor blades, the rotor blades are preferably divided into groups of three rotor blades in each group. The upper segments 5 of the rotor blades of each group are then retained at the respective opposite vertices of the base of the inverted pyramid corresponding to that group.

The method and structure for securing or supporting the upper segments 5 of the rotor blades relative to the inverted pyramid on the base 1 of the wind turbine 100 is described in more detail with reference to FIG. 4. Each upper segment 5 is located facing two vertices of the base of the inverse pyramid. Near these vertices, the attachment points 11, 12 are formed in the upper segment 5 or in the lower segment 4 of the rotor blades. Bracing wires 9 connect the tips (the distal ends) of the upper segments 5 to the attachment points 11, 12, while stiffener wires 10 connect approximately the center of the upper segments 5 of the rotor blades to the same attachment points 11, 12. Additional bracing wires, not shown in FIG. 4, can be used to connect different areas of the upper segments 5 of the rotor blades to the same attachment points 11, 12 of the opposite rotor blades.

The bracing wires 9, 10 (and any additional retaining wires) can be attached to the attachment points 6 defining the vertices of the base of the inverted pyramid instead of the attachment points 11, 12. Typically, the attachment points 11, 12 are different from the attachment points 6, but the attachment points 6 could be used instead of the attachment points 11, 12 to attach the bracing wires 8 of the inverted pyramid and the bracing wires 9, 10 of the upper segments 5 of the rotor blades.

In this exemplary embodiment of the invention, the bracing wires 9, 10 (and any additional retaining wires) are taut, i.e. without sagging, but are not or only negligibly pretensioned. As the rotor 102 rotates, the rotor blades are forced outward by the action of inertia and aerodynamic forces, tensioning all the retaining wires.

FIG. 5 shows all of the bracing wires 9, 10 retaining the three rotor blades of the rotor 102 of the wind turbine 100 in this exemplary embodiment. If a wind turbine 100 has more than three rotor blades, the rotor blades are preferably divided into groups comprising three rotor blades each. The upper segments 5 of each group are then retained near the respective opposite vertices of the base of the inverted pyramid corresponding to the corresponding group at the attachment points 11, 12.

Figure 6:
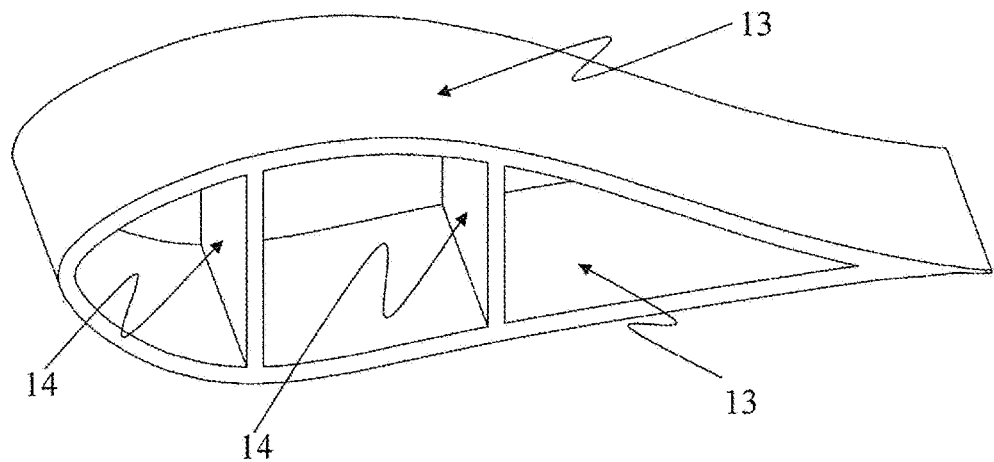
FIG. 6 shows a typical segment of an airfoil of the wind turbine rotor blades having a constant cross-section.

FIG. 6 shows a typical segment of an airfoil of the rotor blades of the wind turbine 100 having a constant cross-section, wherein the spacing between the rounded front end and the opposite tapered end of the airfoil is constant along the entire length of the airfoil. An internal rib structure 14 is used to support or retain an outer shell 13 of the rotor blades. Additional internal rib elements can be provided if required. Rotor blades having a constant cross-section of the aerofoil are cheaper to manufacture, as they can be produced using a pultrusion process. However, it would of course also be possible to use rotor blades having a non-constant cross-section that taper towards their distal end, for instance, in the wind turbine 100 according to the invention. Thus, the specific shape and configuration of the rotor blades does not constitute a limitation of this invention.

Figure 7:
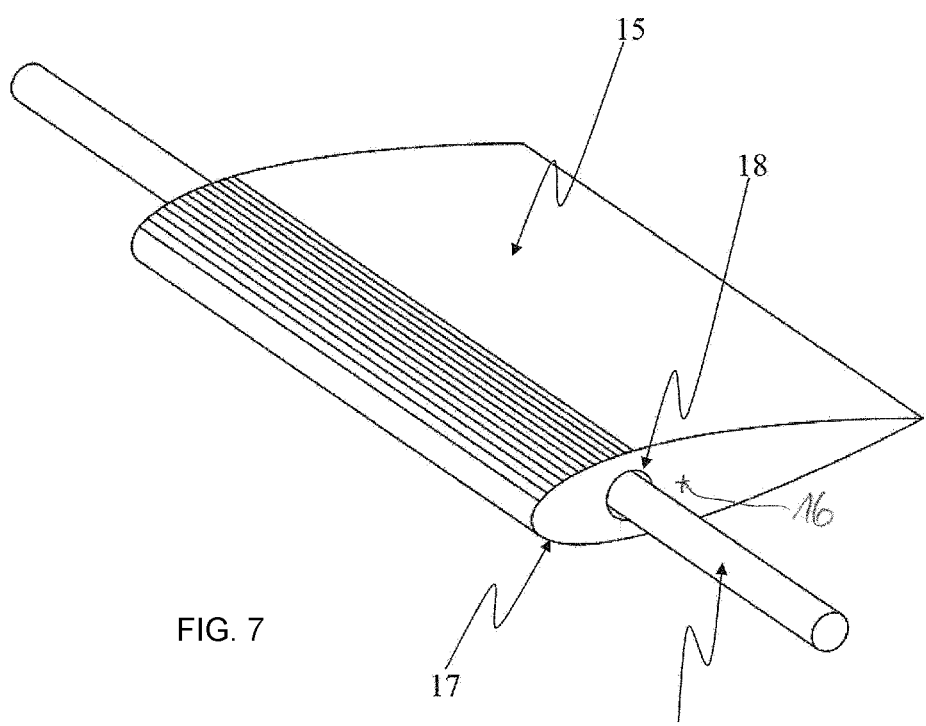
FIG. 7 shows an aerodynamic fairing for the bracing wires.

FIG. 7 shows an aerodynamic fairing element 15 which can be used to reduce the tugging on the bracing wires 9, 10 caused by their aerodynamic drag. A cross-section 17 of the fairing element 15 is a low drag airfoil, the cross-section of which is substantially constant along its entire length, wherein the spacing between the forward rounded end and the opposite tapered end of the airfoil is constant along the entire length of the airfoil. The fairing element 15 has a drilled hole 18 along its length. The bracing wires 9, 10 typically have a circular cross-section to permit them to pass through the drilled hole 18. Once the fairing element 15 has been attached to the bracing wires 9, 10, the fairing element 15 is retained on the bracing wires 9, 10 so as to be freely rotatable about a longitudinal axis of the bracing wires 9, 10, which corresponds substantially to the longitudinal axis of the drilled hole 18. The inner diameter of the drilled hole 18 is slightly larger than the outer diameter of the bracing wires 9, 10 so as to ensure free rotation of the fairing element 15 about the bracing wires 9, 10. An aerodynamic center of gravity of the fairing element 15 extends along the length of the airfoil and is denoted by the reference numeral 16. Preferably, the longitudinal axis of the borings 18 extends in parallel to the aerodynamic center of gravity 16 of the fairing element 15. The hole 18 is located between the aerodynamic center of gravity 16 and the rounded front end of the airfoil, such that the aerodynamic forces acting on the fairing element 15 align the fairing element 15 along the locally acting wind direction, wherein regardless of the wind direction, the rounded front end of the airfoil always faces windward and the pointed end faces leeward.

To facilitate the attachment of the fairing element 15 to the bracing wires 9, 10, the fairing element 15 can be formed bi-partite with a sectional plane between the two parts passing through the drilled hole 18, preferably dividing the drilled hole 18 along its longitudinal length into two hollow cylinder segments of equal size which, when assembled, form the drilled hole 18. Preferably, the separating plane extends through the longitudinal axis of the drilled hole 18 and the aerodynamic center of gravity 16. The two parts of the fairing element 15 can be placed around the bracing wires 9, 10 and clipped to each other or be otherwise attached to each other. The fairing element 15 may be manufactured using inexpensive materials, such as extruded foam (foamed plastic) or other plastic that is as light as possible.

Figure 8:
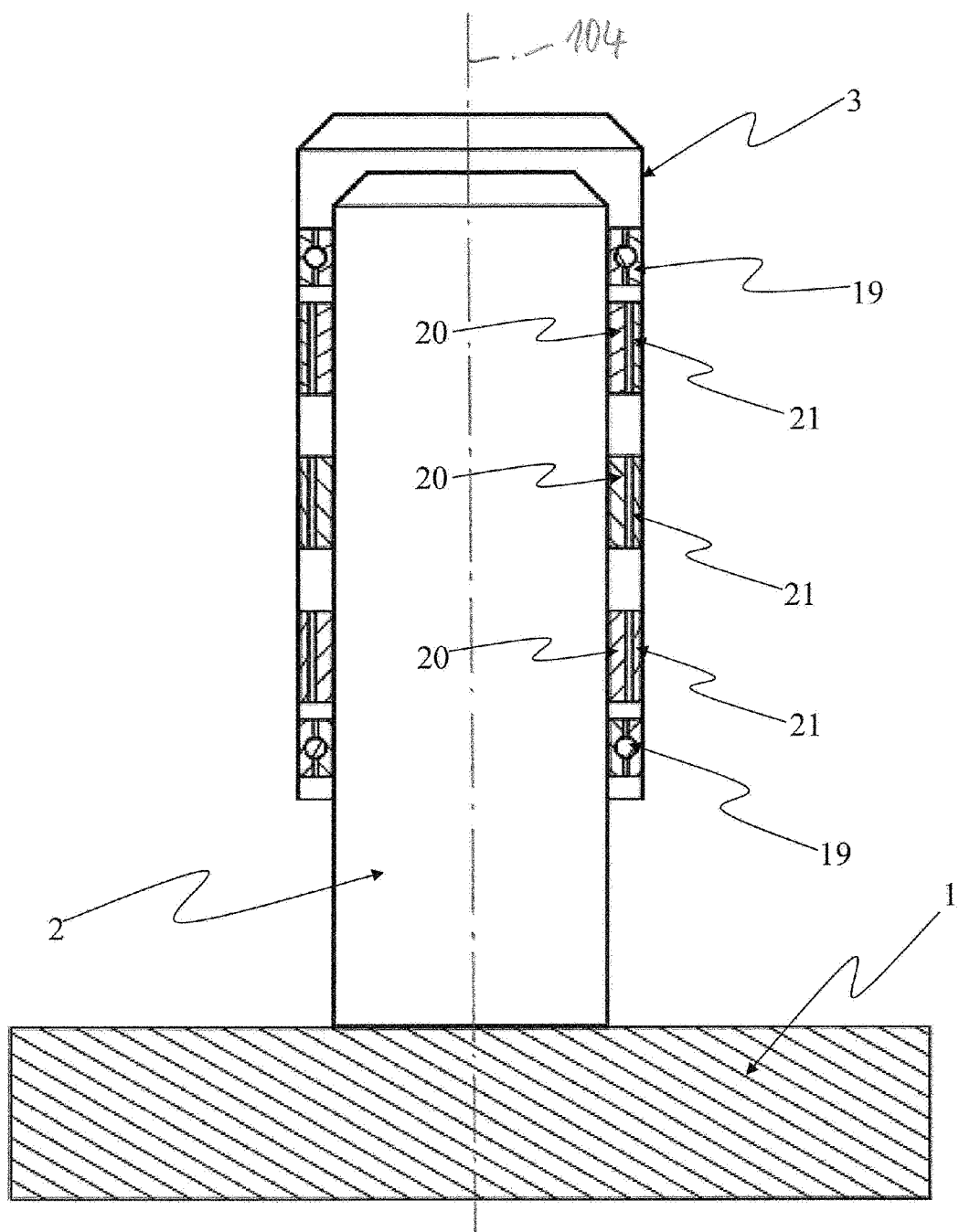
FIG. 8 shows a cross-section of the rotating hub, the fixed support and the base of the wind turbine.

FIG. 8 shows a cross-section through the rotating hub 3, the fixed support 2 and the base 1 of the wind turbine 100. The base 1 is fixed to the ground or to another element, such as a floating platform. The mount 2 is firmly secured to the base 1.

Bearing elements 19 are used to rotatably mount the rotating hub 3 on the mount 2, which bearing elements are for instance ball bearings, roller bearings or magnetic bearings, such that the hub 3 can freely rotate about the axis of rotation 104. In the exemplary embodiment shown, magnets 21 are permanently attached to the rotating hub 3, while stator windings 20 are attached to the mount 2. The permanent magnets 21 and the stator windings 20 are arranged to directly generate electricity based on the rotation of the hub 3. The hub 3 is rotated by the aerodynamic forces acting on the rotor blades 4, 5, which are attached to the hub 3, as shown in FIGS. 3-5.

Figure 9:
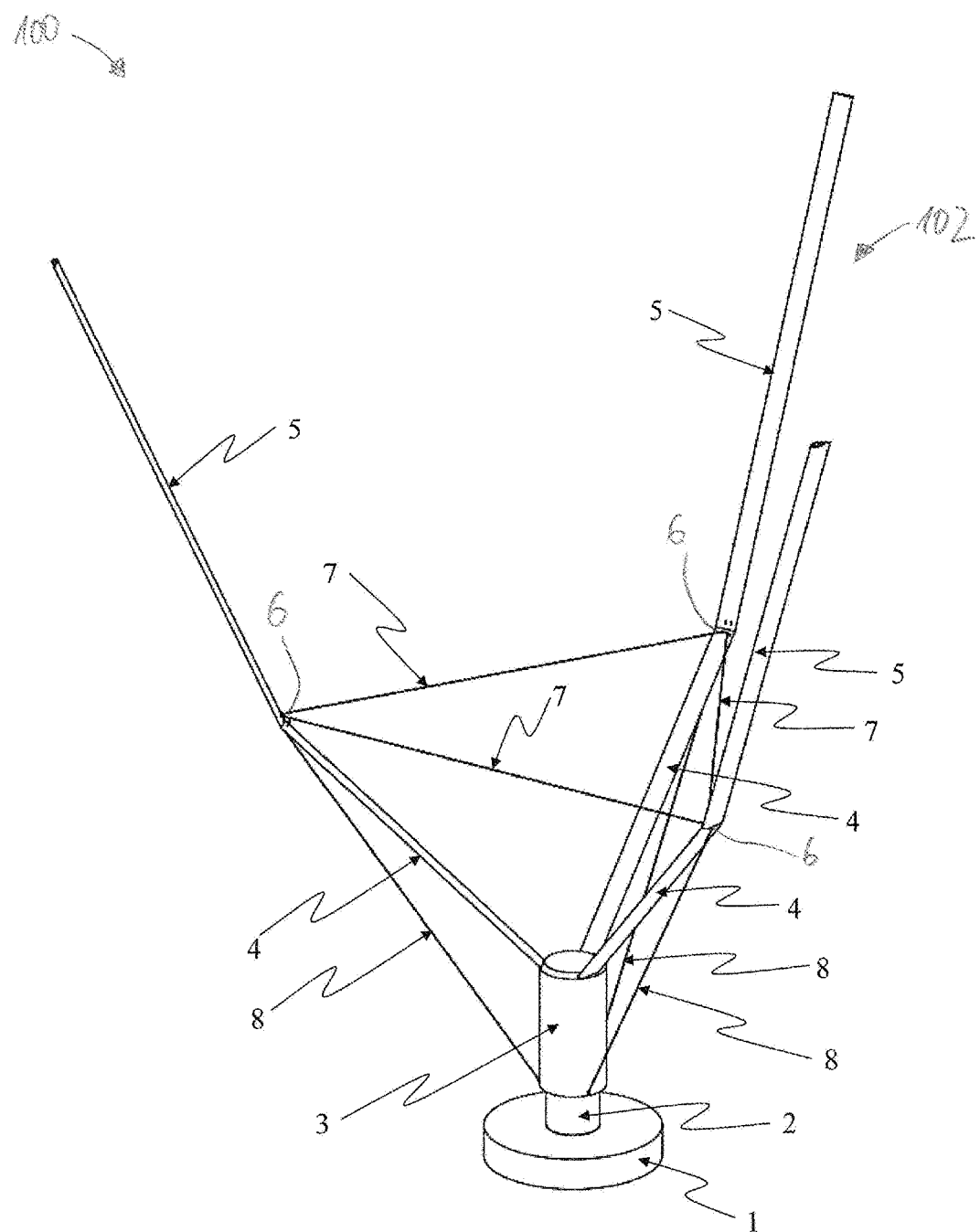
FIGS. 9-11 show another exemplary embodiment of a wind turbine according to the invention having bracing wires and in part guy wires.
Figure 10:
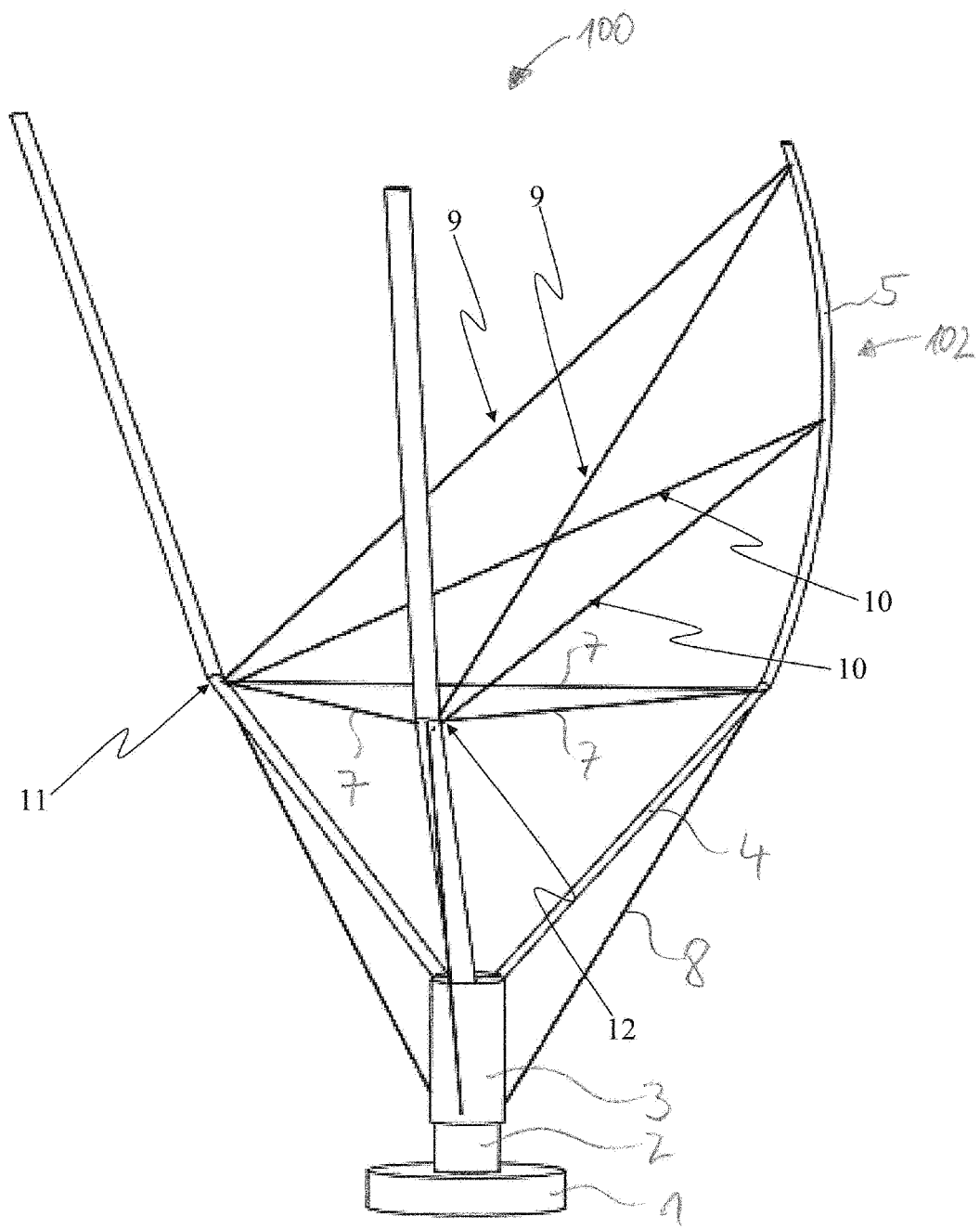
Figure 11:
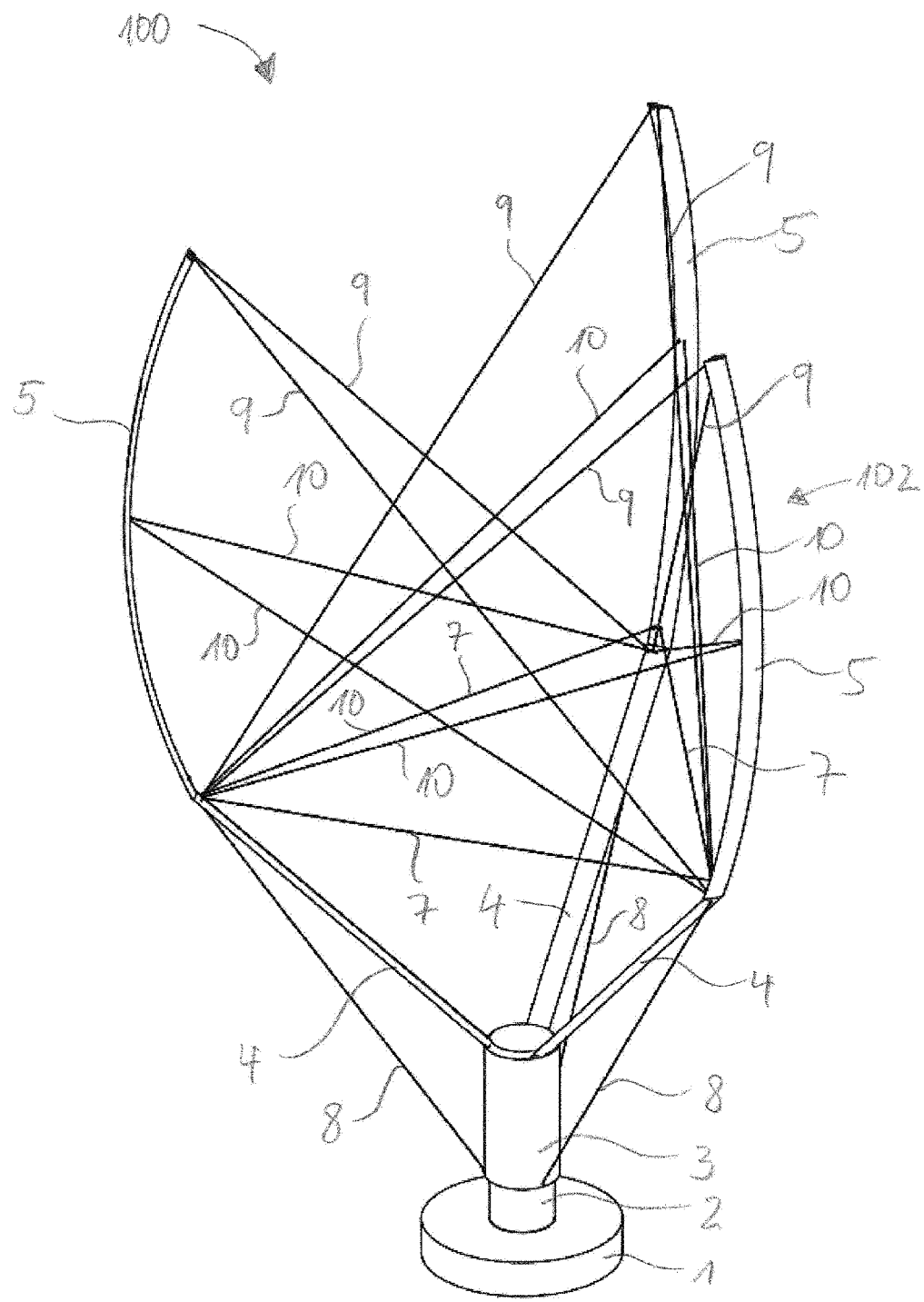

FIGS. 9-11 show an alternative exemplary embodiment of this invention, i.e. a vertical wind turbine 100 without a long central support or bearing element, in which the upper segments 5 of the rotor blades are bent inwards to form curved rotor blades. This is achieved by pretensioning the bracing wires 9, 10 which retain and support the upper segments 5.

The bi-partite rotor blades 4, 5, of which the lower and upper segments 4, 5 are firmly interconnected, are essentially the same as those shown in FIG. 3. The only difference is the greater angle between the length of the lower segment 4 and the upper segment 5, which is such that the upper segments 5 project outwards in FIG. 9 instead of extending vertically as in FIG. 3. However, the inverse pyramid is the same as previously described with reference to the first exemplary embodiment of FIGS. 3-5.

FIG. 10 shows an upper segment 5 of one of the rotor blades of the wind turbine 100 bent inwards under the pretension of the bracing wires 9, 10. The bracing wires 9, 10 are attached to the attachment points 11, 12, which are located near the two opposing vertices of the base of the inverted pyramid, as previously described with reference to FIG. 4. The bracing wires 9, 10 can also be attached to the same attachment points 6 as the guy wires 7 of the inverted pyramid. An increase in the tension acting on the bracing wires 9, 10 causes the upper segment 5 of the rotor blade to move inward to form a curved rotor blade.

FIG. 11 shows all the rotor blades of the wind turbine 100 in their final position curved inwards, with the corresponding bracing wires 9, 10 attached to the attachment points 11, 12 (or to the attachment points 6) near the vertices of the base of the inverted pyramid. It should be noted that additional bracing wires (not shown in FIG. 11) may be used to retain or support the upper segment 5 of a rotor blade also between the segments where the bracing wires 9, 10 engage with the segment 5. It is particularly advantageous if, for a given rotor blade, all bracing wires are attached to the same attachment points at the opposite rotor blades.

If a wind turbine 100 has more than three rotor blades, the rotor blades are preferably divided into groups of three rotor blades each. The upper segments 5 of the rotor blades of each group are then retained at the respective opposite corners of the base of the inverted pyramid corresponding to that group. Thus, the rotor 102 preferably has a number of rotor blades N×3, wherein N is a natural positive number greater than zero. In every case, three rotor blades are combined into a group, within which an inverse pyramid is then formed. I.e., for a rotor 102 having six rotor blades, there are two inverse pyramids. The pyramids preferably have a triangular base, in particular a base in the form of an isosceles or equiangular triangle.

FIGS. 12-15 show yet another exemplary embodiment of a wind turbine 100 according to the invention, i.e. a vertical wind turbine 100 without a long central supporting or bearing element, in which the upper segments 5 of the rotor blades, originally having a straight length, are bent inwards to form curved rotor blades. This is achieved by pretensioning the bracing wires 9, 10 which retain and support the upper segments 5. Thus, in this example, in the relaxed state shown in FIG. 12 (without bracing wires 9, 10), the length of the lower segments 4 is at an angle of approximately 180° to the length of the upper segments 5. The inverse pyramid is exactly the same as in the previously described exemplary embodiments.

Figure 12:
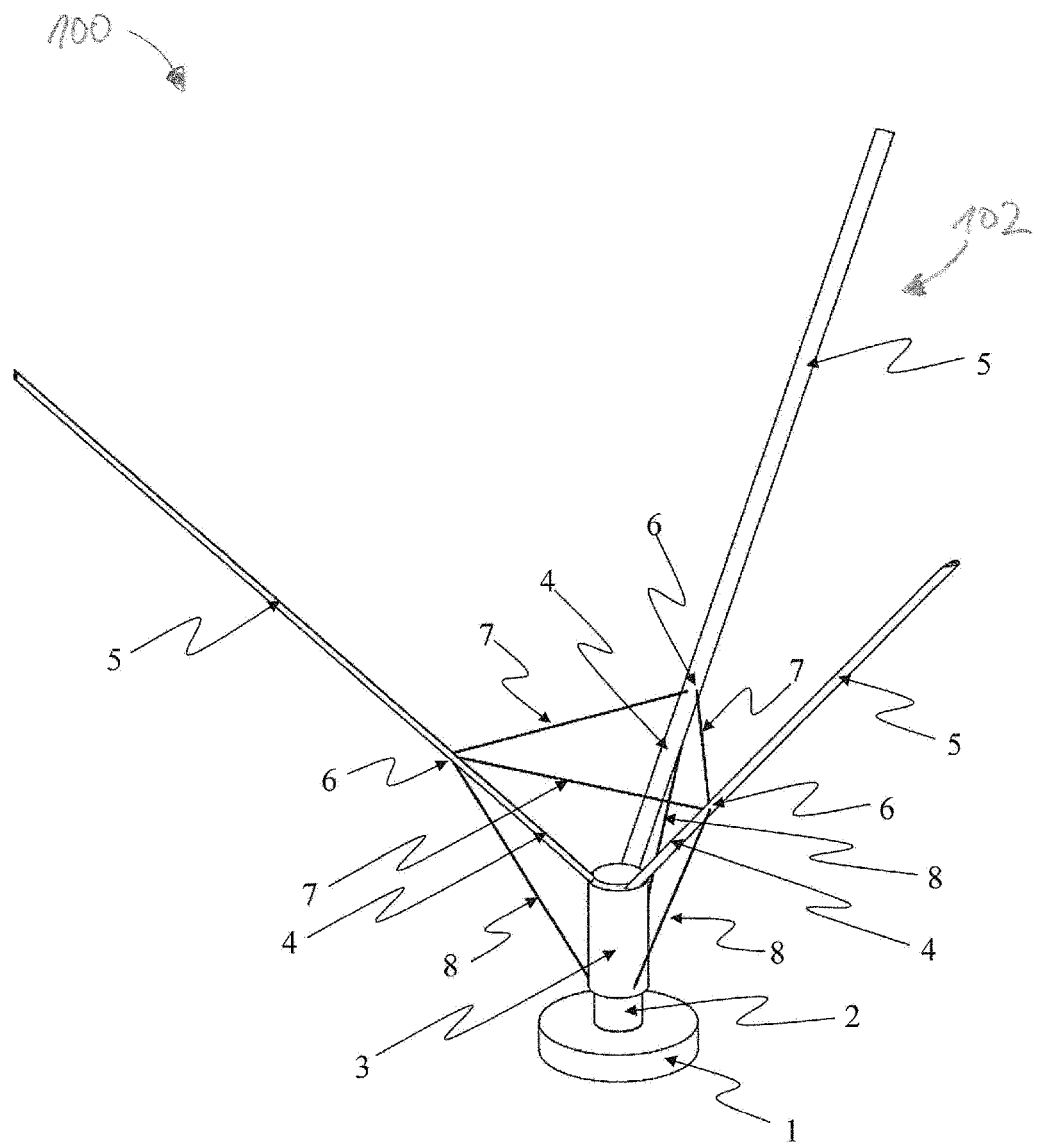
FIGS. 12-15 show yet another exemplary embodiment of a wind turbine according to the invention having bracing wires and in parts guy wires.

FIG. 12 shows a wind turbine 100 having a rotor 102 having three rotor blades in a relaxed state. The reference numeral 6 again denotes selected attachment points along the lower segment 4 and the rotor blades. The guy wires 7 secure the attachment points 6 to each other, while bracing wires 8 secure the same attachment points 6 to a lower segment of the rotating hub 3 near the base 1. When the wires 7, 8 are pretensioned, they cause the bracing of the segment of the rotor blades extending from the attachment points 6 to the hub 3, thus forming a stable platform, which has the shape of an inverted pyramid, wherein the attachment points 6 forms the vertices of the base of the inverted pyramid. This inverted pyramid is the same as in the previously described exemplary embodiments of FIGS. 3 and 9, in which the lower segments 4 and the upper segments 5 of the rotor blades are attached to each other at an angle. The angle at which the lower segments 4 and the upper segments 5 of the rotor blades are attached to each other has no effect on the construction of the inverted pyramid, as the inverted pyramid is formed by the lower segments 4 of the rotor blades, which are provided and formed equally for all exemplary embodiments.

Figure 13:
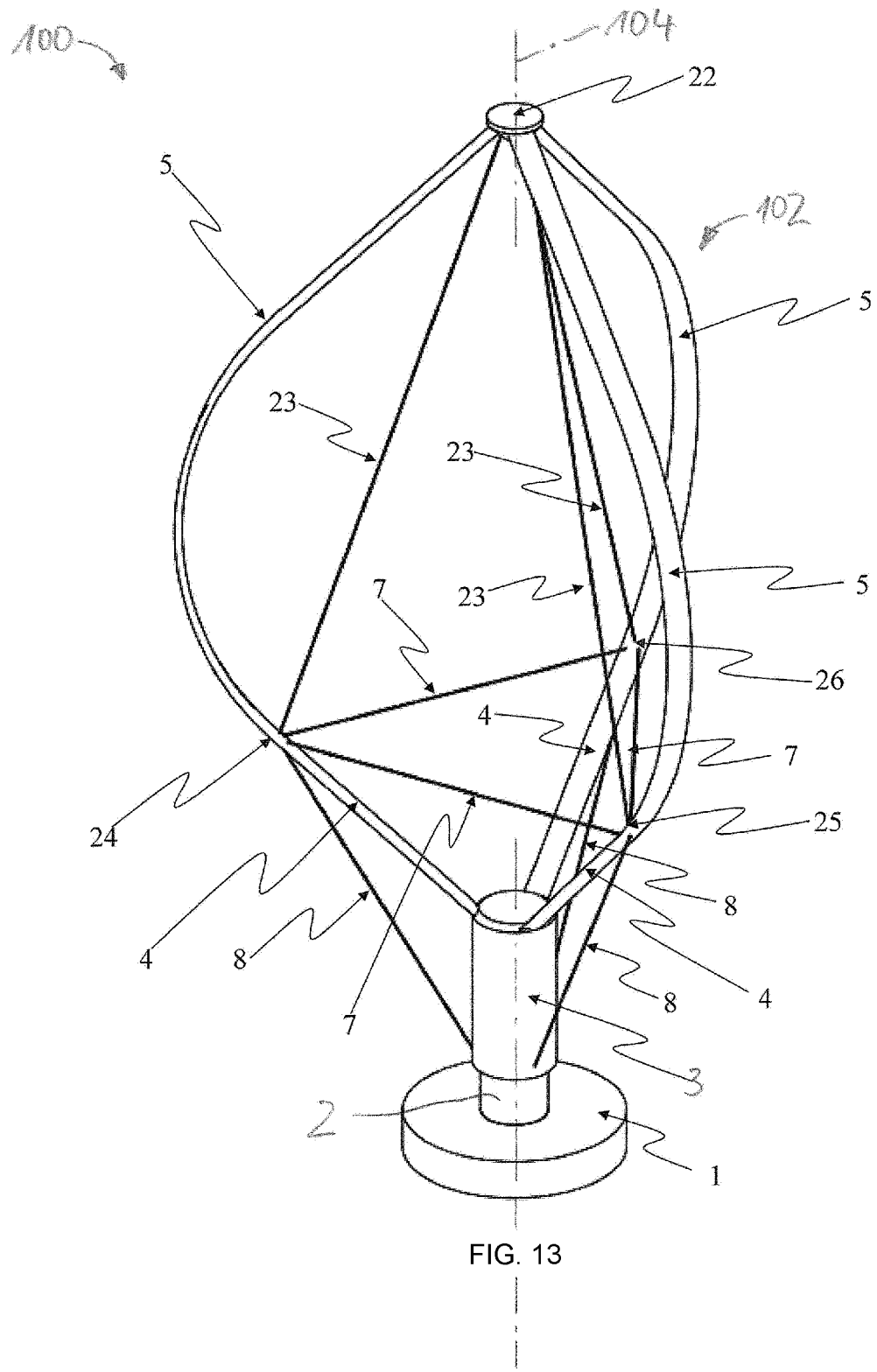

FIG. 13 shows all the rotor blades of the wind turbine 100 with the rotor 102 having three rotor blades in their final curved positions and attached to a joint connection element 22, through which the axis of rotation 104 passes. Retaining wires 23 are used to retain this connection element 22 at attachment points 24, 25 and 26, which are arranged in the vicinity of the attachment points 6 and the vertices of the base of the inverted pyramid, respectively.

The retaining wires 23 can be attached to the same attachment points 6 that define the vertices of the base of the inverted pyramid, but in principle the attachment points 24, 25 and 26 could be other attachment points, but preferably located near the attachment points 6.

Figure 14:
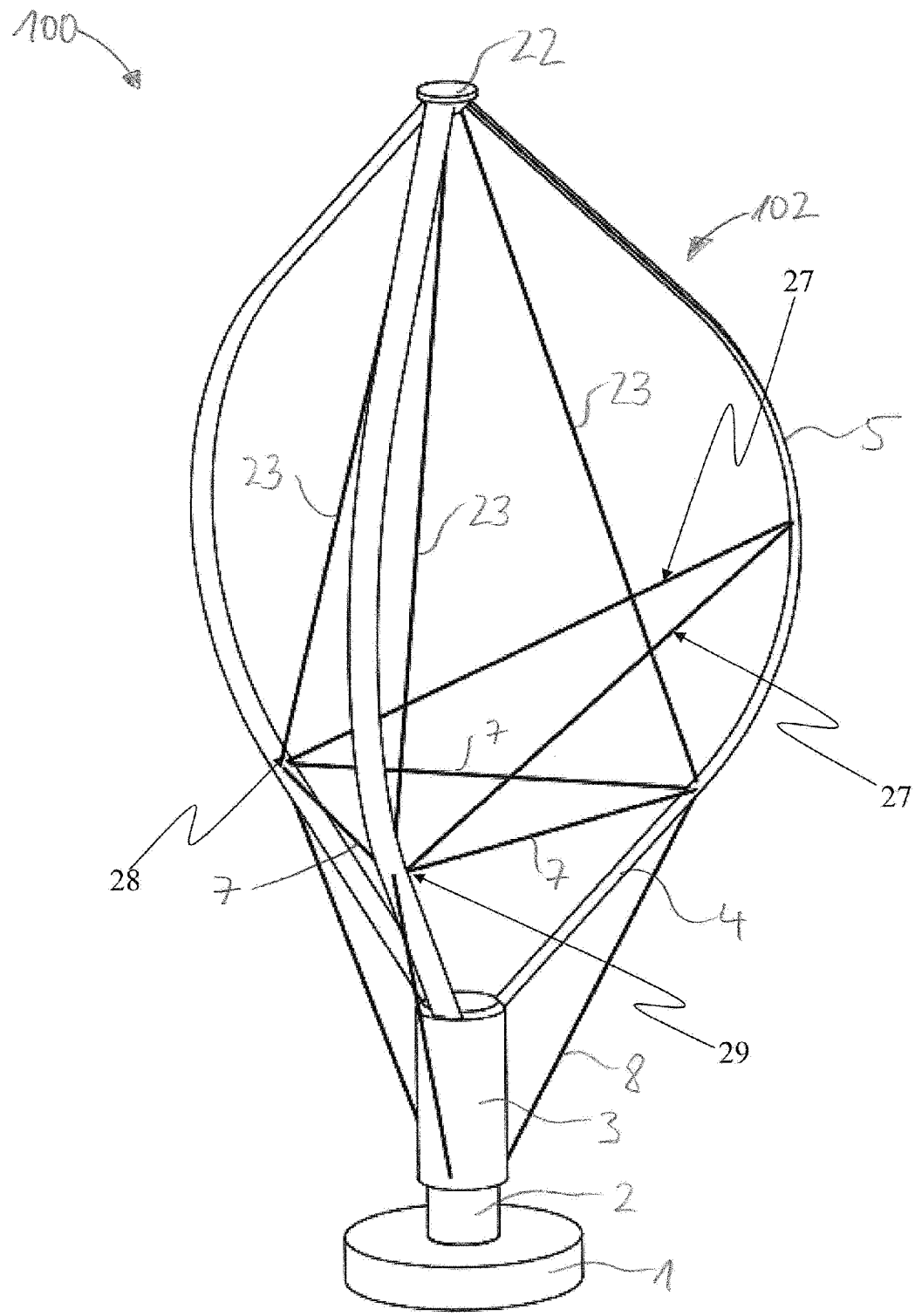

FIG. 14 shows further retaining wires 27, which provide a support or retaining function approximately midway along the length of the upper segments 5 of the rotor blades. In FIG. 14, the retaining wires 27 are shown for only one of the rotor blades. The retaining wires 27 are attached to attachment points 28, 29 located near the two vertices of the base of the inverted pyramid opposite the rotor blade. The further retaining wires 27 could be attached to the same attachment points 6 that define the vertices of the base of the inverted pyramid. On principle, the attachment points 28, 29 can also be other attachment points, but preferably arranged in the vicinity of the attachment points 6.

Additional retaining wires (not shown) can be used to retain or support the upper segment 5 of a rotor blade also between the segments where the retaining wires 23, 27 engage with the segment 5. It is particularly advantageous if, for a given rotor blade, all retaining wires are attached to the same attachment points at the opposite rotor blades.

Figure 15:
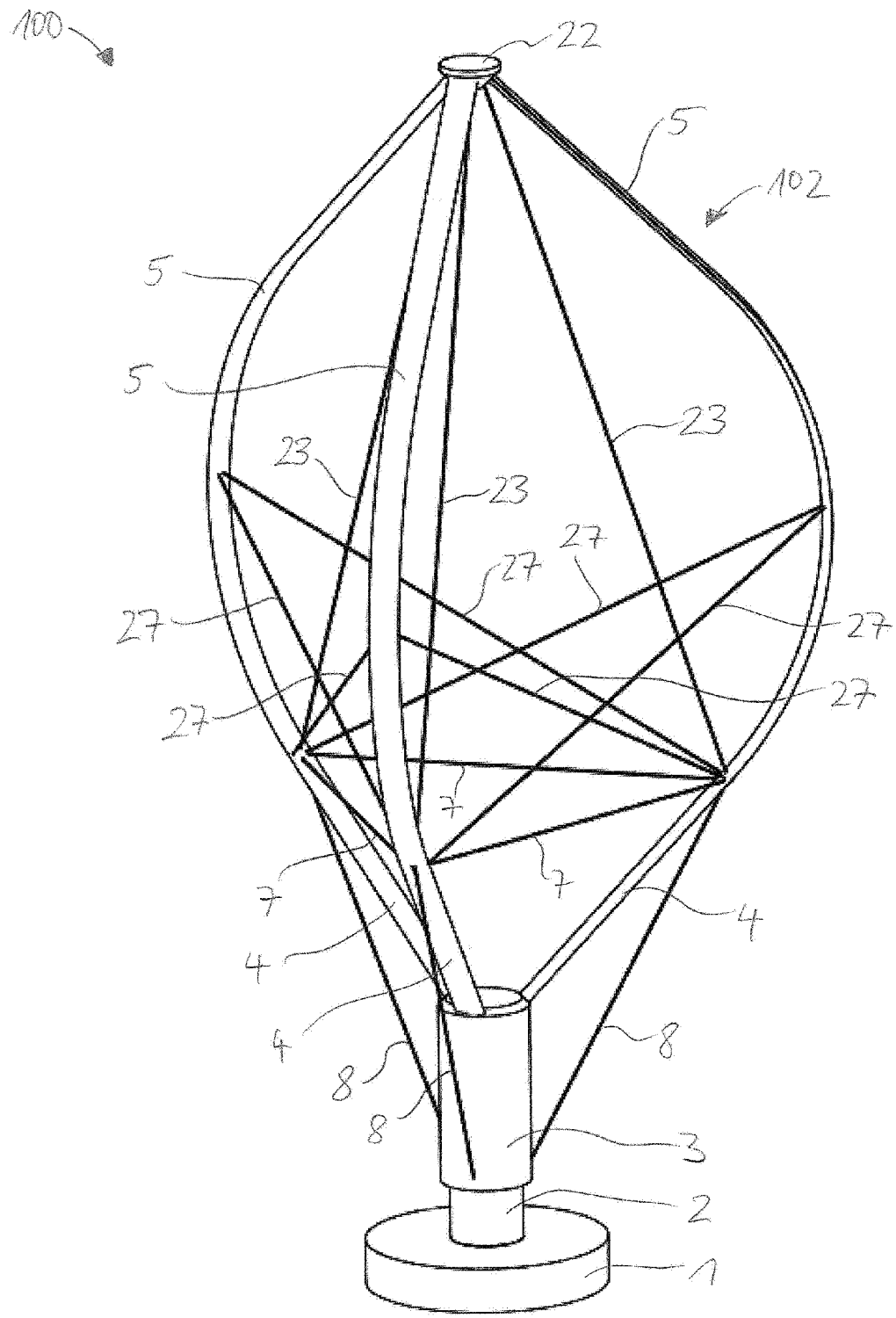

FIG. 15 shows the wind turbine 100 of FIGS. 13 and 14 with all the retaining wires 27 supporting and retaining the rotor blades. If the wind turbine 100 has more than 3 rotor blades, the rotor blades are divided into groups of 3 rotor blades each. The upper segments 5 of the rotor blades of each group are then attached to the facing vertices of the inverse pyramid corresponding to the corresponding group.

Figure 16:
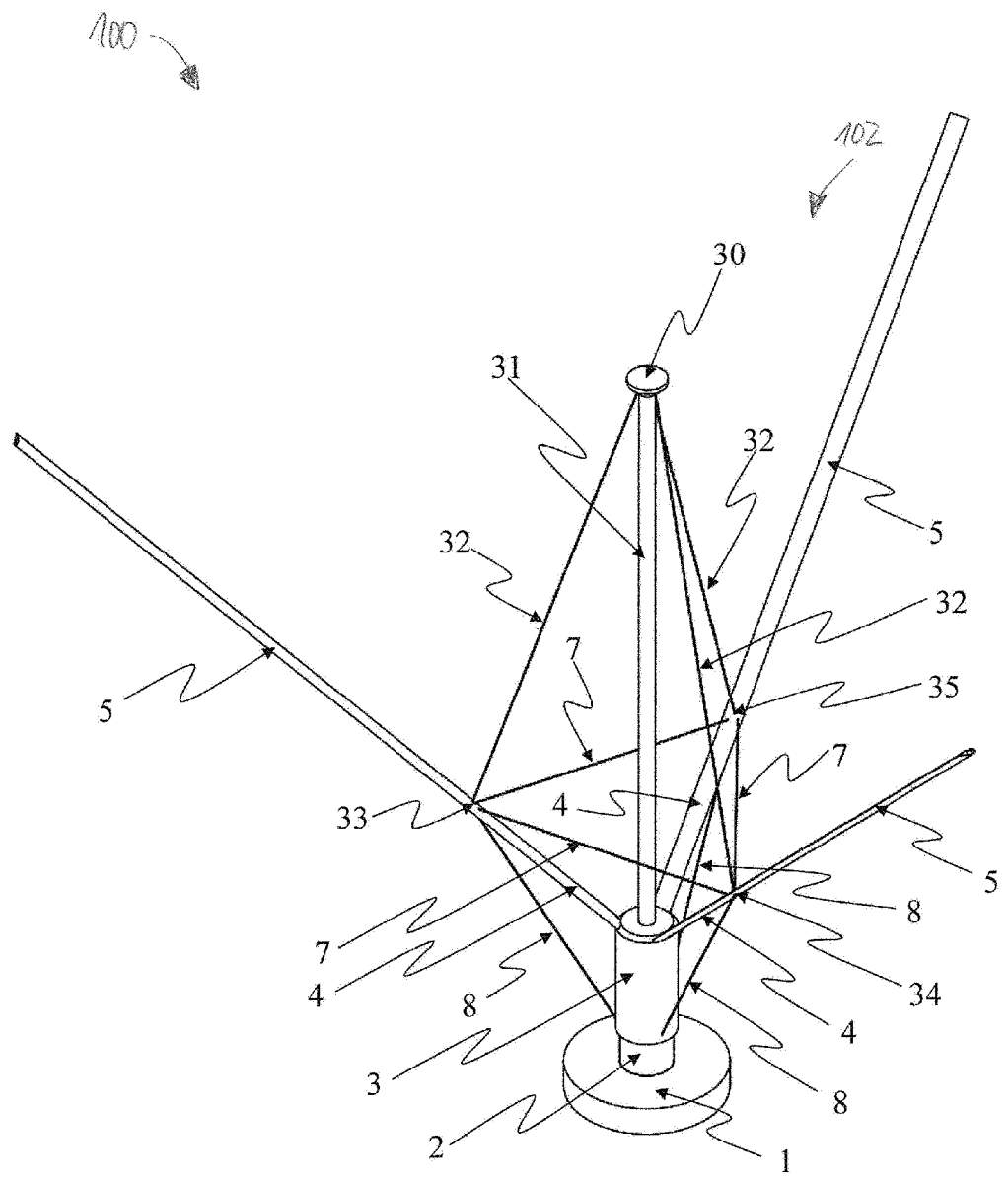
FIGS. 16 and 17 show yet another exemplary embodiment of a wind turbine according to the invention having bracing wires and guy wires.
Figure 17:
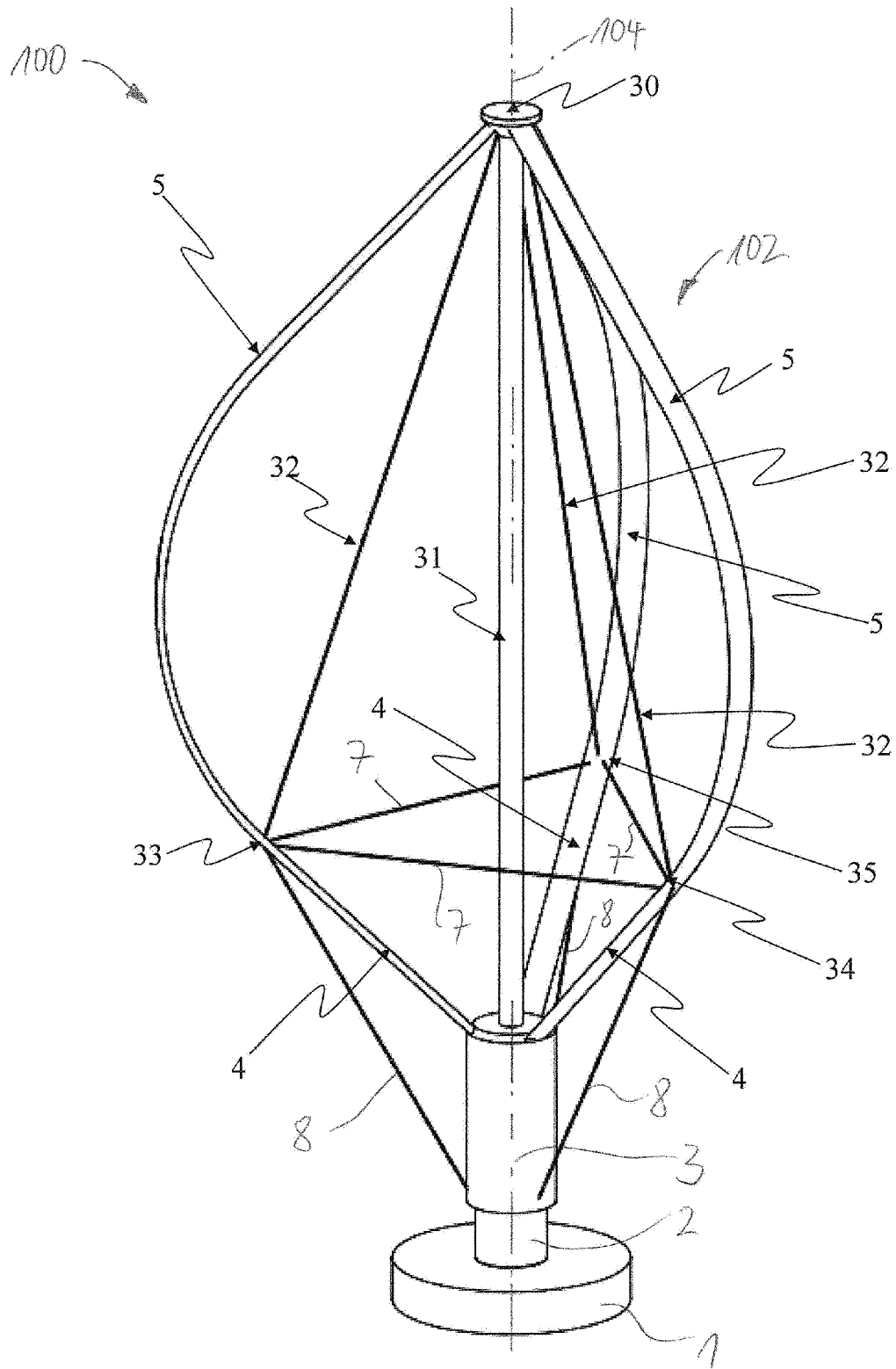

FIGS. 16 and 17 show yet another exemplary embodiment of a wind turbine 100 according to the invention, i.e. a vertical wind turbine 100 having a long central supporting or bearing element 31, the lower end of which is attached to the rotating hub 3. In this regard, the central support or bearing element 31 is internally attached and retained by means of attachment wires 32 to attachment points 33, 34 and 35 which form the vertices of the base of the inverted pyramid, or to attachment points 6 or to other attachment points located near the vertices of the base of the inverted pyramid. The rotor blades, which initially have a straight length in their relaxed state, are bent inwards to form curved rotor blades. The upper distal end of the upper segments 5 of the rotor blades is attached to a joint connection element 30, which in turn is attached to the tip of the central support or bearing element 31. In this embodiment, despite the curved rotor blades, no bracing wires are required to retain and support the upper segment 5 of the rotor blades and bend inwards.

The inverted pyramid is designed in the same manner as previously described with reference to FIG. 12. First, the attachment points 6 (not shown in FIG. 16 for clarity) are selected along the lower segments 4 of the rotor blades. The guy wires 7 interconnect the attachment points 6, while bracing wires 8 secure the attachment points 6 to the lower segment of the rotating hub 3 near the base 1. When the wires 7, 8 are pretensioned, this creates a stable platform in the area of the base of the wind turbine 100, which has the shape of an inverted pyramid, wherein the vertices of the base of the pyramid are defined by the attachment points 6.

In FIG. 16, the lower segments 4 and the upper segments 5 of the rotor blades are attached to each other to form straight rotor blades, such as those also shown in FIG. 12. The lower segment 4 of the rotor blades is firmly secured to the rotating hub 3, wherein the rotor blades extend outwards and upwards at an angle from the hub 3 in the relaxed state. The connection element 30 is firmly secured to the tip of the central supporting or bearing element 31. The attachment points 33, 34 and 35 are selected along the lower segments 4 or the upper segments 5 of the rotor blades. The attachment wires 32 retain and support the connection element 30 at the attachment points 33, 34, and 35. When the attachment wires 32 are pretensioned, they cause the bracing of the central support or support element 31 and create a stable system securing the central support or support element 31 to the inverted pyramid in the area of the base of the wind turbine 100. The central supporting or bearing element 31 rotates in conjunction with the connection element 30 and the fixing wires 32, and with the inverted pyramid in the area of the base. The attachment wires 32 may also be attached to the attachment points 6 forming the vertices of the base of the inverted pyramid, as previously described with reference to FIG. 12. The attachment wires 32 may also be attached to various attachment points 33, 34 and 35 as described above, but these attachment points are preferably located near the attachment points 6 or the vertices of the base of the inverted pyramid.

FIG. 17 shows all the rotor blades in their final curved position with their distal ends attached to the joint connection element 30 at the tip of the central supporting or bearing element 31.

Figure 18:
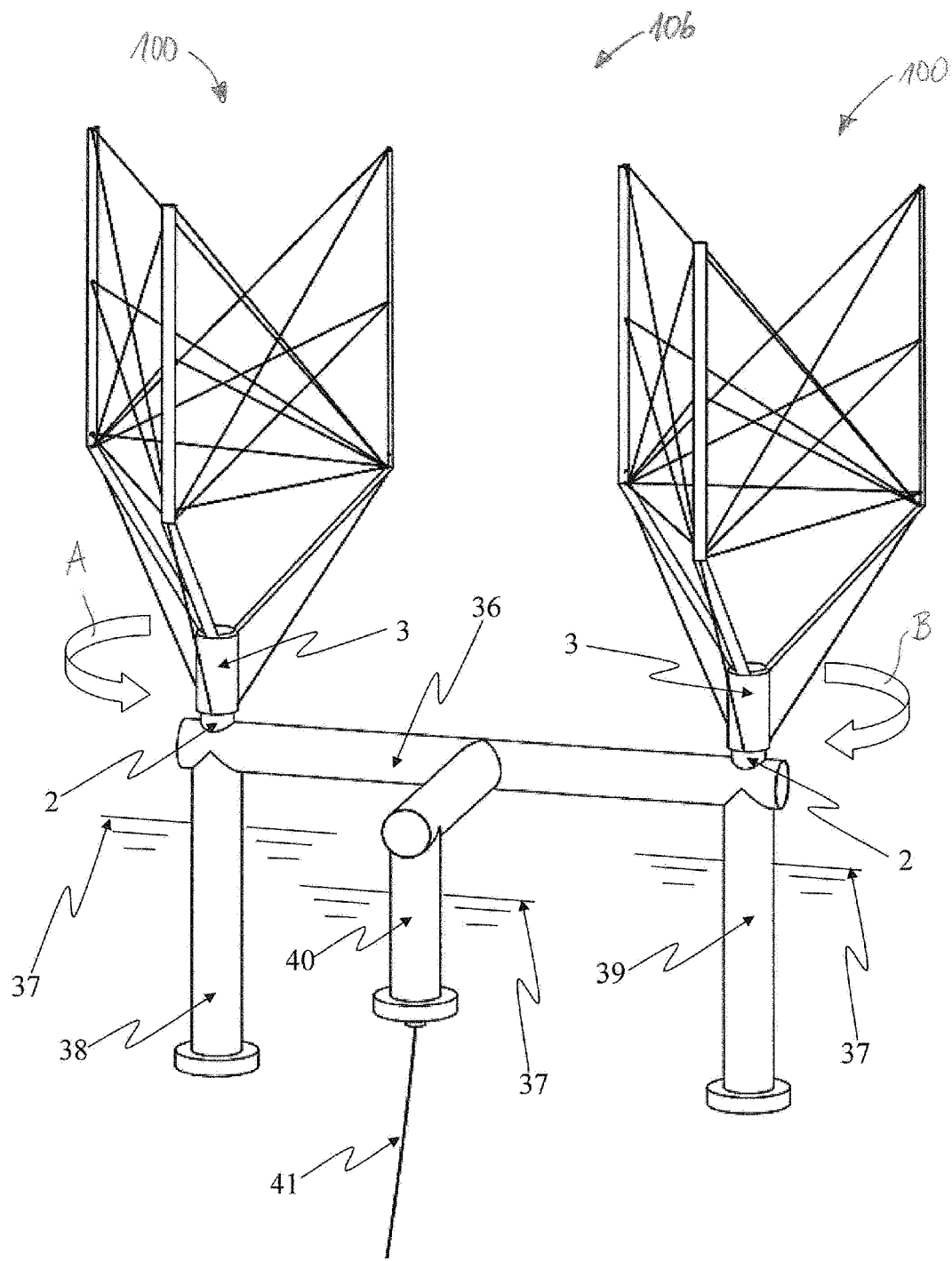
FIG. 18 shows two wind turbines according to the invention, as shown in FIG. 5, mounted on a floating platform.

FIG. 18 shows a floating wind farm 106 according to the invention having two vertical wind turbines 100 without a central support or bearing element, which are mounted on a floating tube-like platform 36. The type of wind turbine 100 used herein has been described previously with reference to FIGS. 3-5. The base 1 or mount 2 of the wind turbine 100 could be directly attached to the floating platform 36. In FIG. 18, the base 1 of the wind turbine 100 is omitted and the mount 2 is attached directly to the floating platform 36.

The floating platform 36 has a tubular design, because such a platform is particularly easy and inexpensive to implement. Obviously, the platform 36 may also be formed as any other type of floating platform, such as a semi-submersible platform. The floating platform 36 comprises three floating chambers 38, 39, and 40 positioned precisely below the waterline 37, wherein ballast is positioned at each of their lowest points for added stability. The two wind turbines 100 installed on the platform 36 are configured to rotate in opposite directions A, B to compensate for torque that may affect the floating platform 36 from each of the wind turbines 100. Each wind turbine 100 generates torque about its vertical axis of rotation 104. If the two wind turbines 100 rotate in opposite directions A, B, the torques compensate each other. The floating platform 36 is attached to the seabed by means of one or more ropes 41, preferably of metal, or chains.

Figure 19:
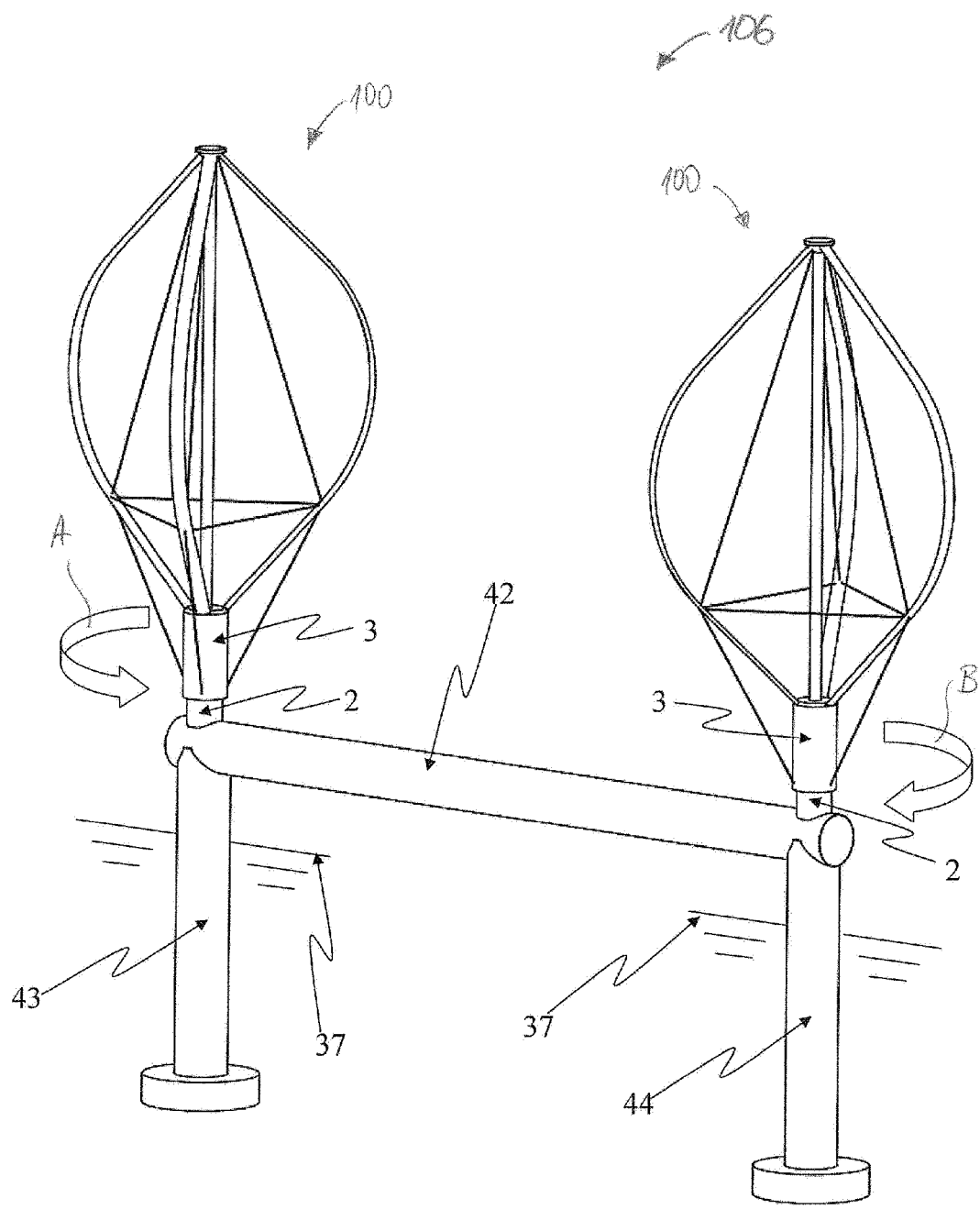
FIG. 19 shows two wind turbines according to the invention, as shown in FIG. 13, mounted on a floating platform.

FIG. 19 shows two vertical wind turbines 100 each having an internally retained support or bearing element 31 (see for instance FIG. 17) mounted on a different type of floating platform 42, which has only two floating chambers 43 and 44. The mount 2 of the two wind turbines 100 is firmly secured to the tubular platform 42. The two wind turbines 100 or their rotors 102 rotate in opposite directions A, B to compensate for torque applied to the floating platform 42 by each of the wind turbines 100.

Figure 20:
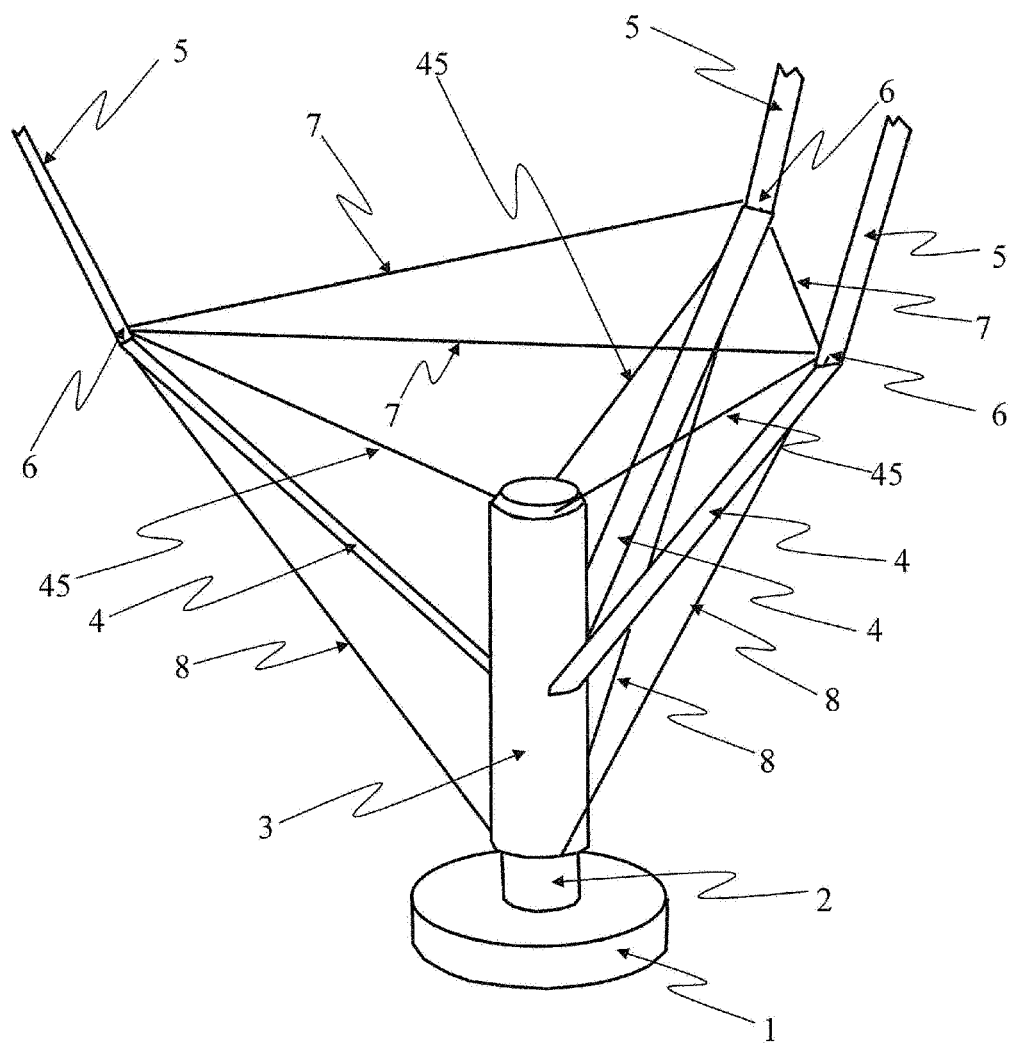
FIG. 20 shows an alternative design of the inverted pyramid in the area of the base of a wind turbine according to the invention.

FIG. 20 shows an alternative embodiment of the inverted pyramid on the base 1 of the wind turbine 100, wherein the lower segment 4 of the rotors is firmly secured to the rotating hub 3 (cf. the previous exemplary embodiments) approximately in the center (between the upper and lower ends) instead of in an upper segment thereof. This embodiment permits additional bracing wires 45 to be provided, connecting the vertices of the base of the inverted pyramid (the attachment points 6) to the upper segment of the rotating hub 3. The inverted pyramid shown in FIG. 20 is formed by the rotating hub 3, the lower segment 4 of the rotor blades in conjunction with the corresponding attachment points 6, the guy wires 7 interconnecting the attachment points 6, and the bracing wires 8 and 45 connecting the same attachment points 6 to the upper segment of the rotating hub 3. All wires 7, 8 and 45 are pretensioned to exert a compressive load on the lower segments 4 of the rotor blades from the attachment points 6 to the rotating hub 3 and to create a stable platform having the shape of the inverse pyramid, wherein the vertices of the base of the inverse pyramids are formed by the attachment points 6 at the lower segment 4 of the rotor blades.

Except for the additional bracing wires 45, the inverted pyramid shown in FIG. 20 is the same as the inverted pyramids of the other previously described exemplary embodiments of FIGS. 3, 9 and 12.

In all figures, the lower segment 4 and the upper segment 5 of the rotor blades are each shown in their original (unbent) state as straight segments 4, 5. More generally, the segments 4, 5 may be straight and attached to each other at a certain angle, as shown in FIGS. 3 and 9. However, they may also be straight and attached to each other to form straight rotor blades, as shown in FIGS. 12 and 16. Alternatively, the segments 4, 5 are bent in their original state and straight (along the local tangents at their line of contact) or attached to each other at an angle. Further, the segments 4, 5 of the rotor blades could additionally be bent by means of pretensioned wires, as described in this description and shown in FIG. 11, when assembled to form the rotor 102 of the angular power plant 100. Rotor blades bent in their original state are not shown here, but it is obvious that the segments 4, 5 of the rotor blades may in their original state each be straight or bent. Of course, fairing elements 15 (cf. FIG. 7) can also be arranged on the wires 23, 27, 32 and/or 45.

The invention claimed is:

1. A wind turbine (100) having a rotor (102) rotatable about a vertical axis of rotation (104), the rotor having a rotating hub (3) and a plurality of rotor blades arranged along an outer periphery of the rotor (102), each rotor blade having a lower segment (4) and an upper segment (5) attached to an upper distal end of the lower segment (4), wherein lower proximal ends of respective lower segments (4) of the rotor blades are each attached to the rotating hub (3), characterized in that the lower segments (4) of the rotor blades in conjunction with the hub (3), guy wires (7) and bracing wires (8) form an inverse pyramid, wherein the guy wires (7) interconnect first attachment points (6) in the area of the distal ends of the lower segments (4) and the bracing wires (8) connect the first attachment points (6) to the hub (3), and wherein the guy wires (7) and the bracing wires (8) are pretensioned.

2. The wind turbine (100) according to claim 1, characterized in that the bracing wires (8) connect the first attachment points (6) to a lower segment of the hub (3).

3. The wind turbine (100) according to claim 1, characterized in that the lower proximal ends of the lower segments (4) of the rotor blades are each secured to an upper segment of the hub (3).

4. The wind turbine (100) according to claim 1, characterized in that the lower proximal ends of the lower segments (4) of the rotor blades are each secured to a central segment of the hub (3).

5. The wind turbine (100) according to claim 4, characterized in that the rotor (102) has further bracing wires (45) connecting the first attachment points (6) to an upper segment of the hub (3).

6. The wind turbine (100) according to claim 1, characterized in that the rotor (102) has a number of rotor blades N×3, wherein N is a non-zero natural number.

7. The wind turbine (100) according to claim 6, characterized in that for N>1 in each case three rotor blades are combined into a group, wherein a separate inverted pyramid is formed within each group.

8. The wind turbine (100) according to claim 1, characterized in that the rotor (102) has first bracing wires (9) connecting, for every rotor blade, an upper distal end of the upper segment (5) of the rotor blade to second attachment points (11, 12) at a lower proximal end of the upper segments (5) or at the upper distal end of the lower segments (4) of rotor blades opposite to the rotor blade.

9. The wind turbine (100) according to claim 8, characterized in that the rotor (102) has further bracing wires (10) connecting, for each rotor blade, a central area of the upper segment (5) located between the distal end and the proximal end of the segment (5) to the second attachment points (11, 12) of the rotor blades facing the rotor blade.

10. The wind turbine (100) according to claim 8, characterized in that the second attachment points (10, 11) are identical to the first attachment points (6).

11. The wind turbine (100) according to claim 8, characterized in that the first bracing wires (9) and the second bracing wires (10) are pretensioned and pull the upper segments (5) of the rotor blades radially inwards and retain them there, resulting in inwardly curved rotor blades of the rotor (102).

12. The wind turbine (100) according to claim 1, characterized in that the rotor (102) has retaining wires (23) retaining a joint connection element (22), to which upper distal ends of the upper segments (5) of inwardly curved rotor blades are attached, at third attachment points (24, 25, 26) at lower proximal ends of said upper segments (5) or at upper distal ends of lower segments (4) of said rotor blades.

13. The wind turbine (100) according to claim 12, characterized in that the rotor (102) has further retaining wires (27) connecting, for every rotor blade, a central area of the upper segment (5) located between the distal end and the proximal end of the segment (5) to the second attachment points (24, 25, 26) of the rotor blades facing the rotor blade.

14. The wind turbine (100) according to claim 12, characterized in that the third attachment points (24, 25, 26) are identical to the first attachment points (6).

15. The wind turbine (100) according to claim 1, characterized in that the rotor (102) has a long central support element (31), the lower end of which is attached to the rotating hub (3) and the upper end of which is attached to the fourth attachment points (33, 34, 35) by means of attachment wires (32) at lower proximal ends of the upper segments (5) or at upper distal ends of the lower segments (4) of the rotor blades.

16. The wind turbine (100) according to claim 15, characterized in that the rotor (102) has a joint connection element (30) attached to the upper end of the long central support element (31), to which upper distal ends of the upper segments (5) of inwardly curved rotor blades are attached.

17. The wind turbine (100) according to claim 15, characterized in that the fourth attachment points (33, 34, 35) are identical to the first attachment points (6).

18. The wind turbine (100) according to claim 1, characterized in that fairing elements (15) are arranged on one or more of the wires (8; 9; 10; 23; 27; 32; 45) of the rotor (102) for reducing the aerodynamic drag of the wires (8; 9; 10; 23; 27; 32; 45) when the rotor (102) rotates.

19. A floating wind farm (106) comprising a floating platform (36, 42) having a plurality of wind turbines (100) mounted thereon, characterized in that the wind turbines (100) are formed according to any one of the preceding claims.

20. A wind farm (106) according to claim 19, characterized in that the rotors (102) of each two wind turbines (100) of the wind farm (106) rotate in opposite directions (A, B).

* * * * *